United States Patent
Sridhara et al.

(10) Patent No.: US 12,475,641 B2
(45) Date of Patent: Nov. 18, 2025

(54) POINT CLOUD ENCODING DEVICE, POINT CLOUD DECODING DEVICE, POINT CLOUD ENCODING METHOD, POINT CLOUD DECODING METHOD, AND PROGRAM

(71) Applicants: KDDI Research, Inc., Saitama (JP); University of Southern California, Los Angeles, CA (US)

(72) Inventors: Shashank Nelamangala Sridhara, Karnataka (IN); Eduardo Hernan Pavez Carvelli, Los Angeles, CA (US); Antonio Ortega, Los Angeles, CA (US); Ryousuke Watanabe, Fujimino (JP); Keisuke Nonaka, Fujimino (JP); Kyouhei Unno, Fujimino (JP)

(73) Assignees: KDDI RESEARCH, INC., Saitama (JP); UNIVERSITY OF SOUTHERN CALIFORNIA, Los Angeles, CA (US)

( * ) Notice: Subject to any disclaimer, the term of this patent is extended or adjusted under 35 U.S.C. 154(b) by 0 days.

(21) Appl. No.: 18/134,110

(22) Filed: Apr. 13, 2023

(65) Prior Publication Data

US 2023/0345016 A1    Oct. 26, 2023

Related U.S. Application Data

(60) Provisional application No. 63/334,679, filed on Apr. 26, 2022.

(51) Int. Cl.
*G06T 17/00* (2006.01)
*H04N 13/15* (2018.01)
(Continued)

(52) U.S. Cl.
CPC ............ *G06T 17/00* (2013.01); *G06T 17/005* (2013.01); *H04N 13/15* (2018.05); *H04N 13/275* (2018.05);
(Continued)

(58) Field of Classification Search
CPC ..... G06T 17/00; G06T 17/005; H04N 13/388; H04N 13/15; H04N 13/324
See application file for complete search history.

(56) References Cited

U.S. PATENT DOCUMENTS

2019/0116352 A1* 4/2019 Pesonen ............... H04N 19/132
2019/0156518 A1* 5/2019 Mammou ................ G06T 5/80
(Continued)

OTHER PUBLICATIONS

M. Bui, L.C. Chang, H. Liu, Q. Zhao, & G. Chen, "Comparative Study of 3D Point Cloud Compression Methods", 2021 IEEE Int'l Conf. on Big Data 5859á61 (Dec. 2021) (Year: 2021).*
(Continued)

*Primary Examiner* — David N Werner
(74) *Attorney, Agent, or Firm* — Greenblum & Bernstein, P.L.C.

(57) ABSTRACT

Encoding efficiency for attribute information in point cloud information is improved.
A point cloud encoding device includes a subsampling unit configured to preserve chroma signals of some points in a point cloud to be encoded and discard chroma signals of remaining points other than those points, and an attribute information encoding unit configured to encode the chroma signals of those points in the point cloud to be encoded and luma signals of all points.

5 Claims, 10 Drawing Sheets

(a) 50% sampling (b) 33% sampling

(51) Int. Cl.
    *H04N 13/275*      (2018.01)
    *H04N 13/324*      (2018.01)
    *H04N 13/388*      (2018.01)
    *H04N 19/186*      (2014.01)
    *H04N 7/015*      (2006.01)
    *H04N 9/64*      (2023.01)
    *H04N 9/77*      (2006.01)
    *H04N 9/808*      (2006.01)
    *H04N 9/825*      (2006.01)
    *H04N 11/24*      (2006.01)
    *H04N 13/257*      (2018.01)

(52) U.S. Cl.
    CPC ......... *H04N 13/324* (2018.05); *H04N 13/388* (2018.05); *H04N 19/186* (2014.11); *H04N 7/0152* (2013.01); *H04N 9/64* (2013.01); *H04N 9/77* (2013.01); *H04N 9/808* (2013.01); *H04N 9/825* (2013.01); *H04N 11/28* (2019.01); *H04N 13/257* (2018.05)

(56) References Cited

U.S. PATENT DOCUMENTS

| | | | |
|---|---|---|---|
| 2019/0318519 A1* | 10/2019 | Graziosi | G06T 15/20 |
| 2020/0275125 A1* | 8/2020 | Mammou | H04N 19/132 |
| 2021/0312667 A1* | 10/2021 | Yea | H04N 19/184 |
| 2021/0329270 A1* | 10/2021 | Yea | H04N 19/172 |
| 2022/0109816 A1* | 4/2022 | Ray | G06T 9/00 |
| 2022/0182593 A1* | 6/2022 | Yin | G06T 7/33 |
| 2022/0309689 A1* | 9/2022 | Harviainen | H04N 19/54 |

OTHER PUBLICATIONS

L. Wang, J. Sun, H. Yuan, R. Hamzaoui, & X. Wang, "Kalman filter-based prediction refinement and quality enhancement for geometry-based point cloud compression", presented at 2021 IEEE Int'l Conf. on Visual Communications & Image Processing (Dec. 2021) (Year: 2021).*

W. Zhang, H. Jiang, Z. Yang, S. Yamakawa, K. Shimada, & L. B. Kara, "Data-driven Upsampling of Point Clouds", 112 Computer-Aided Design 1â13 (Jul. 2019) (Year: 2019).*

D. Graziosi, O. Nakagami, S. Kuma, A. Zaghetto, T. Suzuki, & A. Tabatabai, "An overview of ongoing point cloud compression standardization activities: video-based (V-PCC) and geometry-based (G-PCC)", 9 APSIPA Transactions on Signal and Information Processing No. 13 (Mar. 2020) (Year: 2020).*

Z. Jia, Y.J. Chang, T.H. Lin, & T. Chen, "Dense Interpolation of 3D Points Based on Surface and Color", 18 IEEE Int'l Conf. on Image Processing 869-872 (Sep. 2011) (Year: 2011).*

V.F. Sevom, S. Schwarz, & M. Gabbouj, "Geometry-Guided 3D Data Interpolation for Projection-Based Dynamic Point Cloud Coding", presented at 7 Eur. Workshop on Visual Information Processing (EUVIP) (Nov. 2018) (Year: 2018).*

S.N. Sridhara, E. Pavez, A. Ortega, R. Watanabe, & K. Nonaka, "Point Cloud Attribute Compression Via Chroma Subsampling", 2022 Int'l Conf. on Acoustics, Speech, & Signal Processing (ICASSP) (May 2022) (Year: 2022).*

Schwarz et al., "Emerging MPEG Standards for Point Cloud Compression", IEEE Journal on Emerging and Selected Topics in Circuits and Systems, vol. 9, No. 1, Mar. 2019, pp. 133-148.

* cited by examiner (a) 50% sampling (b) 33% sampling (c) 25% sampling (a) Original (b) RAHT : 2.46bpp (c) RAGFT : 2.01bpp (d) S+RAHT : 2.12bpp (e) S+RAGFT: 1.77bpp

POINT CLOUD ENCODING DEVICE, POINT CLOUD DECODING DEVICE, POINT CLOUD ENCODING METHOD, POINT CLOUD DECODING METHOD, AND PROGRAM

NOTICE

This invention was made with government support under grant No. CNS1956190 awarded by the National Science Foundation. The government has certain rights in the invention.

BACKGROUND OF THE INVENTION

Field of the Invention

The present invention relates to a point cloud encoding device, a point cloud decoding device, a point cloud encoding method, a point cloud decoding method, and a program.

Description of Related Art

Since the past, an attribute information encoding technique for a point cloud like that disclosed in Non-Patent Document 1 has been known.

Non-Patent Document

[Non-Patent Document 1] "Emerging MPEG standards for point cloud compression," IEEE Journal on Emerging and Selected Topics in Circuits and Systems, vol. 9, no. 1, pp. 133-148, 2019

SUMMARY OF THE INVENTION

However, in the related art described above, in a case where attribute information for a point cloud is 3-channel color information (for example, RGB signals), information of all 3 channels is encoded for all points, which leads to a problem of an increase in the amount of data after encoding.

The present invention was contrived in view of such circumstances, and one object thereof is to improve encoding efficiency for attribute information in point cloud information.

According to an aspect of the present invention, there is provided a point cloud encoding device including: a subsampling unit configured to preserve chroma signals of some points in a point cloud to be encoded and discard chroma signals of remaining points other than those points; and an attribute information encoding unit configured to encode the chroma signals of those points in the point cloud to be encoded and luma signals of all points.

According to an aspect of the present invention, in the point cloud encoding device, the subsampling unit performs subsampling on chroma signals so that points where chroma signals are preserved are at a predetermined ratio.

According to an aspect of the present invention, in the point cloud encoding device, the subsampling unit preserves chroma signals only for points where the remainder of a result of dividing a sum of coordinate values in a three-dimensional coordinate system by a predetermined integer value is 0 in the point cloud to be encoded.

According to an aspect of the present invention, the point cloud encoding device further includes a color conversion unit configured to convert color information of each point in the point cloud to be encoded into a luma signal and chroma signals.

According to an aspect of the present invention, there is provided a point cloud decoding device including: an attribute information decoding unit configured to decode chroma signals of some points and luma signals of all points in a reconstructed point cloud reconstructed from a bitstream; and an interpolation unit configured to interpolate chroma signals of a non-decoding target point which is a point where chroma signals are not decoded in the reconstructed point cloud on the basis of a decoded chroma signal of a decoding target point which is a target point for decoding chroma signals.

According to an aspect of the present invention, in the point cloud decoding device, the interpolation unit interpolates the chroma signals of the non-decoding target point using the decoded chroma signals of each of a predetermined number of the decoding target points present in the vicinity of the non-decoding target point.

According to an aspect of the present invention, in the point cloud decoding device, the point cloud decoding device further includes an inverse color conversion unit configured to convert a luma signal and chroma signals of each point in the reconstructed point cloud into color information.

According to an aspect of the present invention, there is provided a point cloud encoding method including: preserving chroma signals of some points in a point cloud to be encoded and discarding chroma signals of remaining points other than those points; and encoding the chroma signals of those points in the point cloud to be encoded and luma signals of all points.

According to an aspect of the present invention, there is provided a program for causing a computer included in a point cloud encoding device to execute: preserving chroma signals of some points in a point cloud to be encoded and discarding chroma signals of remaining points other than those points; and encoding the chroma signals of those points in the point cloud to be encoded and luma signals of all points.

According to an aspect of the present invention, there is provided a point cloud decoding method including: decoding chroma signals of some points and luma signals of all points in a reconstructed point cloud reconstructed from a bitstream; and interpolating chroma signals of a non-decoding target point which is a point where chroma signals are not decoded in the reconstructed point cloud on the basis of decoded chroma signals of a decoding target point which is a target point for decoding chroma signals.

According to an aspect of the present invention, there is provided a program for causing a computer included in a point cloud decoding device to execute: decoding chroma signals of some points and luma signals of all points in a reconstructed point cloud reconstructed from a bitstream; and interpolating chroma signals of a non-decoding target point which is a point where chroma signals are not decoded in the reconstructed point cloud on the basis of decoded chroma signals of a decoding target point which is a target point for decoding chroma signals.

According to the present invention, it is possible to obtain the effect of enabling encoding efficiency for attribute information in point cloud information to be improved.

DETAILED DESCRIPTION OF THE INVENTION

1. Introduction

Figure 1:
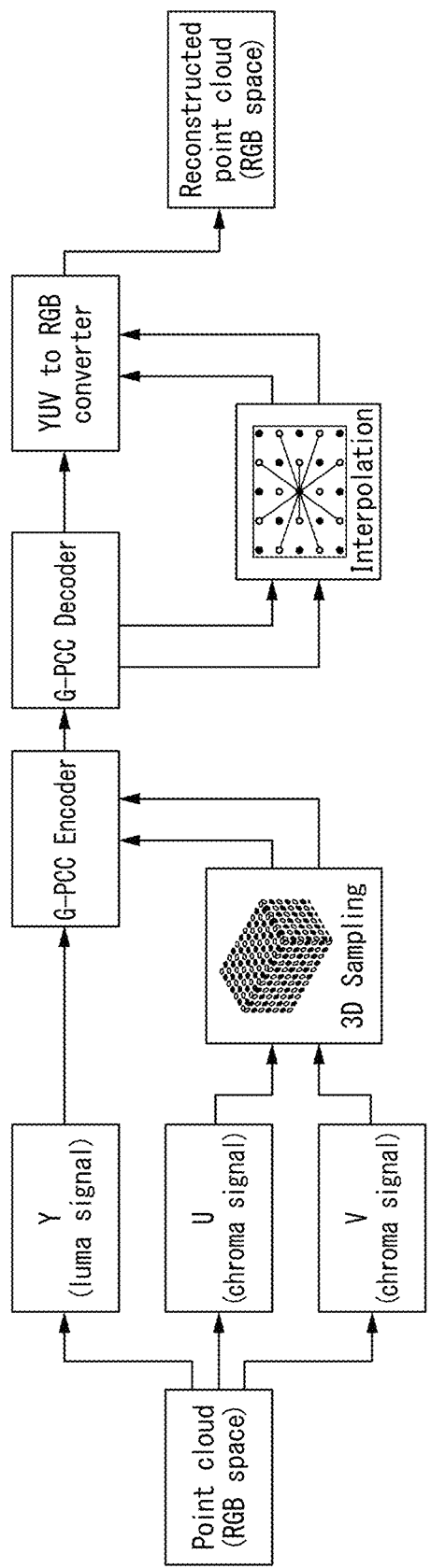
FIG. 1 is a diagram illustrating a point cloud attribute compression pipeline using a G-PCC encoder with chroma subsampling according to an embodiment.

Thanks to advances in sensor technology and faster acquisition processes, point clouds are becoming increasingly popular means to represent 3D scenes. Therefore, compression of point clouds has received considerable attention and the Moving Picture Experts Group (MPEG) is currently developing compression standards specifically for point clouds. A 3D point cloud is a list of unordered points in $R^{N \times 3}$, $X = \{(x_i, y_i, z_i)\}$, along with their corresponding attributes $\{(r_i, g_i, b_i)\}$. Attributes can be color, intensity or surface normals. In order to effectively store and transmit point clouds, both geometry and attributes have to be compressed. In this work, we focus on compression of point cloud color attributes.

Geometry-based point cloud compression (G-PCC) and video based point cloud compression (V-PCC) are the two approaches standardized by MPEG. G-PCC methods exploit geometry information to encode the associated attributes, while V-PCC is a projection based method wherein 3D points are projected onto a 2D image so that the existing image/video encoding methods can be used. The region adaptive hierarchical transform (RAHT), a multiresolution orthogonal transform, has been evaluated as a G-PCC codec by MPEG. In addition to RAHT, various alternative transforms have been proposed for attribute compression.

For color attribute compression, the RGB values are first transformed to a YUV space where the Y, U and V components are encoded. Given that the human visual system is more sensitive to the changes in luminance (Y) than to the changes in chrominance (U and V), in image and video coding chroma components are often encoded at a lower resolution than luminance components, without significant perceptual degradation. Most current video compression standards, including H.264/AVC and H.265/HEVC, provide different sampling rates for the luminance and chrominance components. These perceptual observations are also valid for point cloud color attributes.

On regular 2D grids, sampling at different rates can be performed by selecting pixels using specific regular patterns in both horizontal and vertical directions. As a result, V-PCC methods can leverage directly the effectiveness of chroma subsampling for video by sampling pixels after they have been projected onto a 2D image. However, G-PCC methods compress the attributes by using the geometry information and the irregular placement of points in 3D space means that chroma subsampling is not as straightforward as for 2D images. In fact, to the best of our knowledge, none of the existing G-PCC methods use chroma subsampling.

In this paper, we propose a new approach to leverage the perceptual redundancies and smoothness of the chroma signals on the point cloud in order to improve the performance of G-PCC methods for attribute compression. We also propose low complexity sampling patterns for different sampling rates. Our approach is based on intersecting a regular sampling pattern on the complete 3D grid with the point cloud geometry. The proposed 3D sampling method is fast and can be implemented with few bitwise operators. We use a simple graph based filter for interpolation, which can be implemented by K-nearest neighbor graph construction and sparse matrix-vector product.

Thus, the proposed sampling method has a low complexity overhead for G-PCC encoders while providing significant gains.

2. Proposed Method 2.1. Chroma Subsampling in Images/Videos

In chroma subsampling the chroma signals (U and V) are encoded at a lower resolution to reduce bitrate, which allows more bandwidth to be allocated to the luma signal. These approaches are motivated by perceptual studies showing that the effect of chroma subsampling is masked by the presence of full resolution luminance.

Chroma subsampling is used in most video coding standards including the recent Versatile Video Coding (VVC). The main components of chroma subsampling are, sampling and interpolation. There are different schemes to sample the chroma components on a 2D grid as shown in Table 1.

Table 1: Different chroma subsampling schemes in images/videos, where V and H correspond to vertical and horizontal resolutions, respectively.

TABLE 1

| subsampling scheme | luma resolution | | chroma resolution | |
|---|---|---|---|---|
| | V | H | V | H |
| 4:4:4 | Full | Full | Full | Full |
| 4:2:2 | Full | Full | Full | 1/2 |
| 4:2:0 | Full | Full | 1/2 | 1/2 |

The most commonly used format is 4:2:0, where the horizontal and vertical resolutions of both the chroma components are halved. In all these sampling formats, 2×2 blocks are considered, where either the upper-left U and V component of the block are selected, or the sampled U and V component are obtained by averaging all the U, V components of a 2×2 block. Note that interpolation/upsampling is carried out by copying the same sampled value to all the 4 respective locations of a 2×2 U, V block. A more sophisticated and widely used method is bilinear interpolation, where upsampling is done by computing weighted average of nearest pixels.

2.2. Challenges in Point Cloud Chroma Subsampling

Unlike in images, defining a sampling pattern and formats for different sampling rates is not straightforward for point clouds. The main challenges with point clouds are that 1) points are irregularly placed in 3D space, 2) there is a lack of spatial correlation, and 3) there is variation in spatial point density. Because of these challenges, classical image and video processing techniques cannot be applied directly to point clouds. In order to use chroma subsampling for G-PCC encoders, we have to design sampling and interpolation techniques for 3D points with desirable properties, including computational efficiency. The complete pipeline of chroma subsampling for G-PCC encoders is shown in FIG. 1.

FIG. 1: Point cloud attribute compression pipeline using G-PCC encoders with chroma subsampling. The luminance signal (Y) will be directly passed to the G-PCC encoder, whereas chrominance signals (U and V) will be downsampled at a given sampling rate before encoding. At the decoder side, we interpolate the downsampled chrominance signal values and reconstruct the attributes of the full resolution point cloud.

2.3. Proposed sampling

Figure 2A:
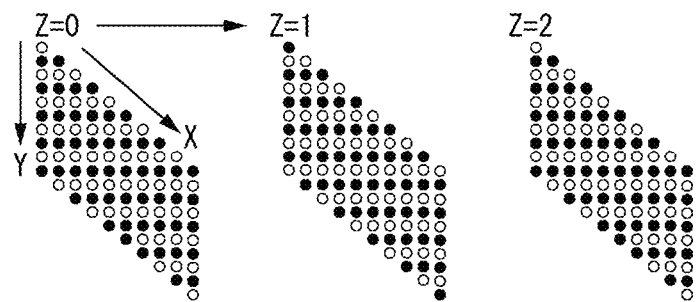
FIG. 2A is a diagram illustrating a sampling pattern in a case where a sampling rate is changed on a three-dimensional grid according to an embodiment.
Figure 2B:
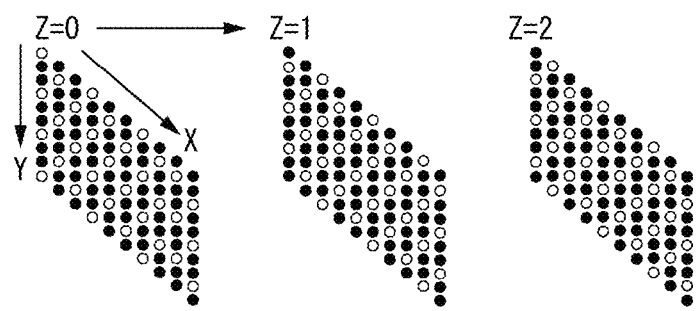
FIG. 2B is a diagram illustrating a sampling pattern in a case where a sampling rate is changed on a three-dimensional grid according to an embodiment.
Figure 2C:
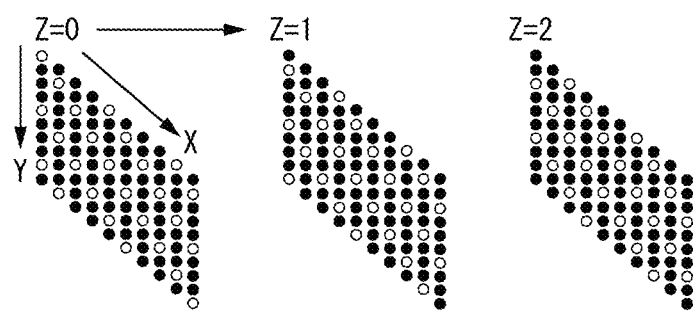
FIG. 2C is a diagram illustrating a sampling pattern in a case where a sampling rate is changed on a three-dimensional grid according to an embodiment.
Figure 3A:
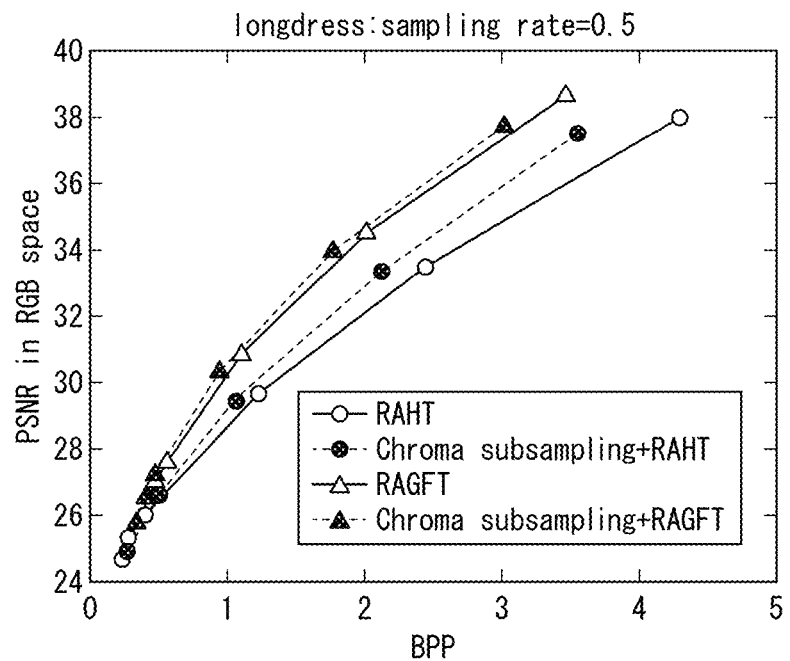
FIG. 3A is a diagram illustrating a distortion rate curve for color attribute compression in an RGB space according to an embodiment.
Figure 3B:
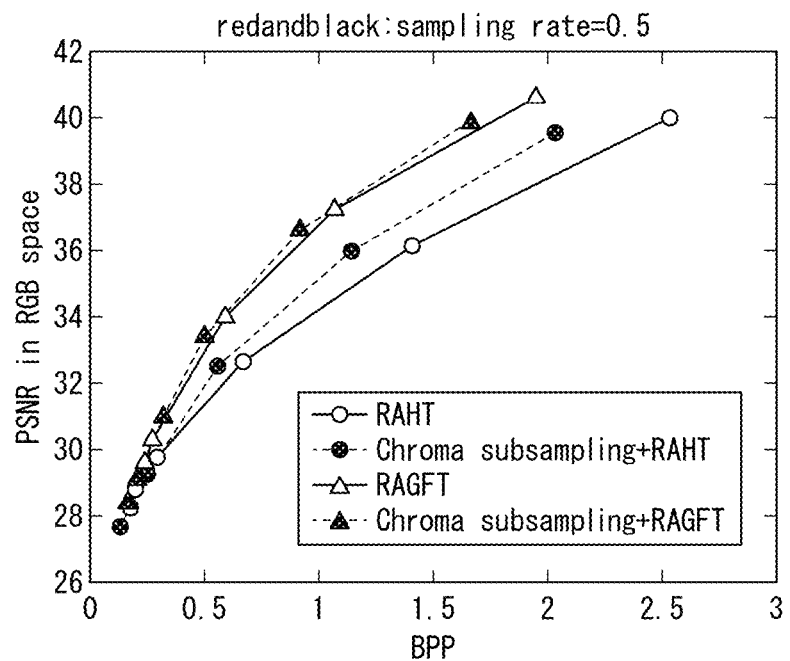
FIG. 3B is a diagram illustrating a distortion rate curve for color attribute compression in an RGB space according to an embodiment.
Figure 3C:
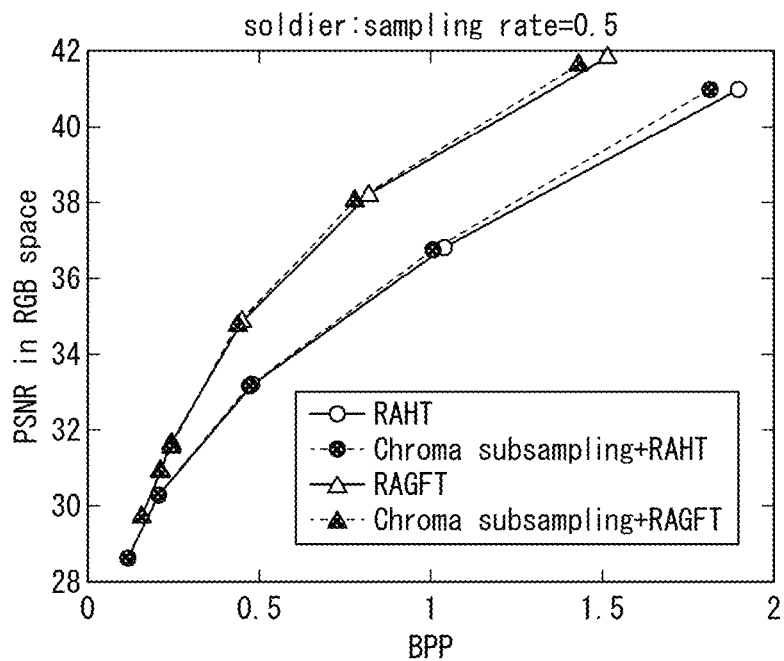
FIG. 3C is a diagram illustrating a distortion rate curve for color attribute compression in an RGB space according to an embodiment.
Figure 3D:
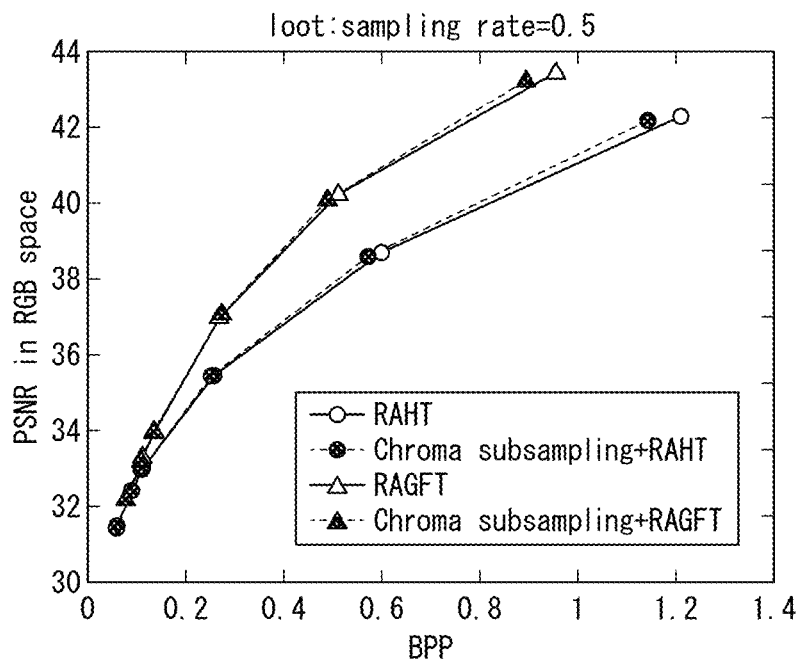
FIG. 3D is a diagram illustrating a distortion rate curve for color attribute compression in an RGB space according to an embodiment.
Figure 4A:
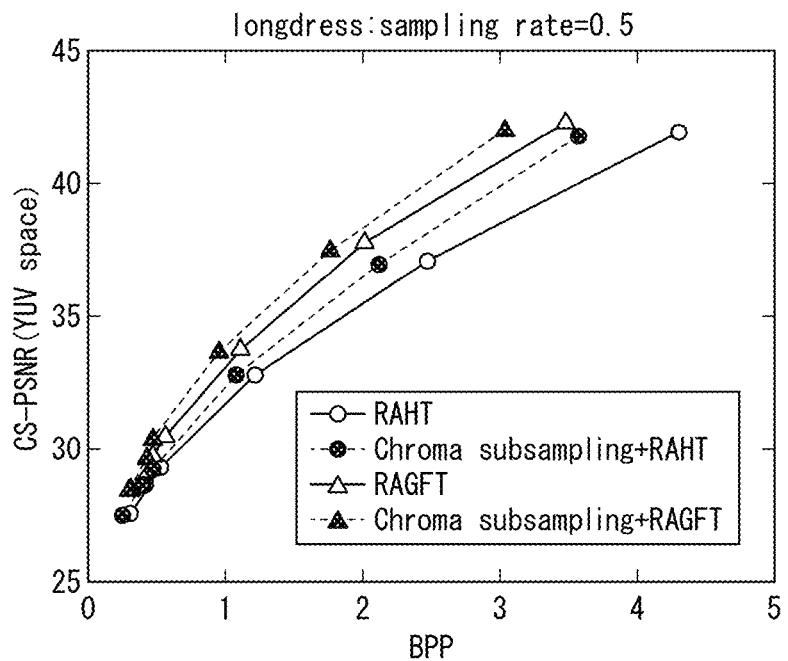
FIG. 4A is a diagram illustrating a distortion rate curve for color attribute compression in a YUV space using CS-PSNR according to an embodiment.
Figure 4B:
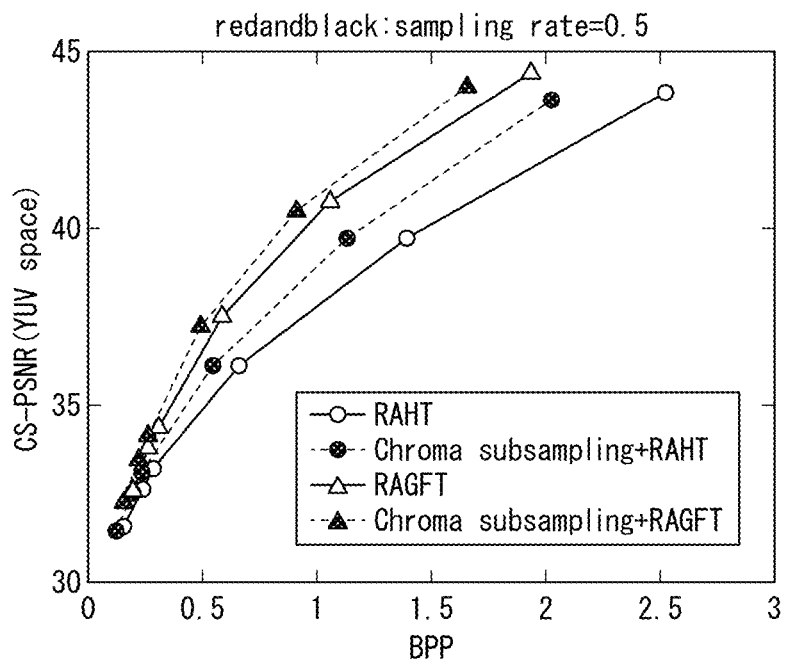
FIG. 4B is a diagram illustrating a distortion rate curve for color attribute compression in a YUV space using CS-PSNR according to an embodiment.
Figure 4C:
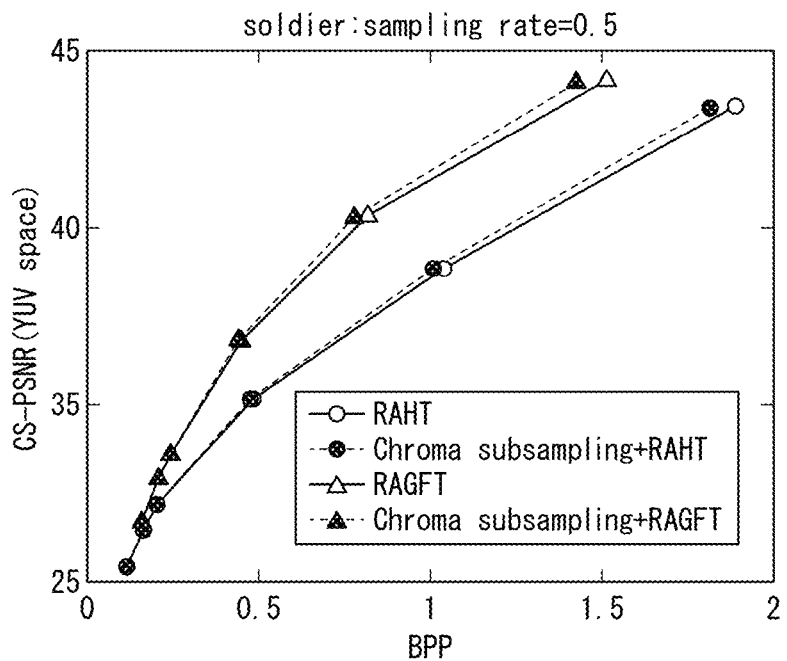
FIG. 4C is a diagram illustrating a distortion rate curve for color attribute compression in a YUV space using CS-PSNR according to an embodiment.
Figure 4D:
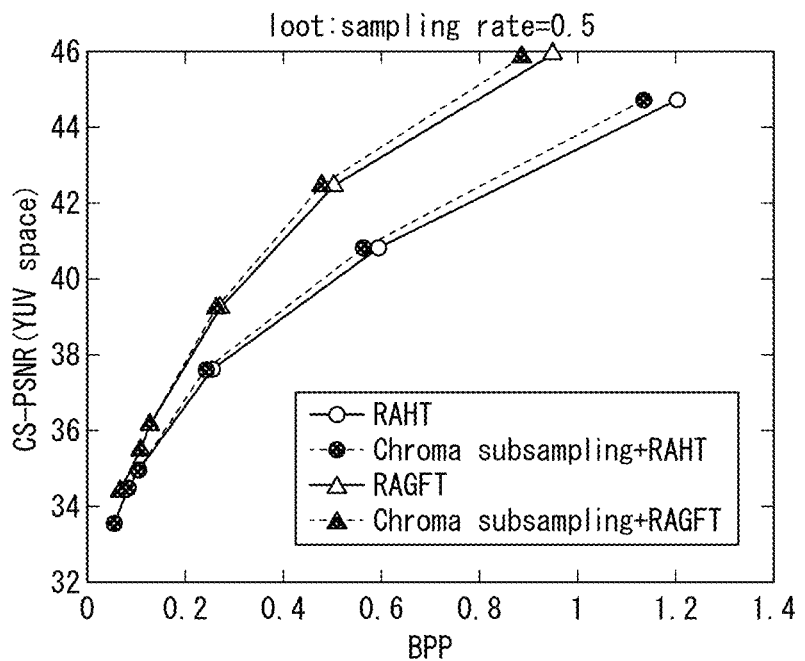
FIG. 4D is a diagram illustrating a distortion rate curve for color attribute compression in a YUV space using CS-PSNR according to an embodiment.
Figure 5A:
FIG. 5A is a diagram illustrating a qualitative comparison of reconstructed point clouds according to an embodiment.
Figure 5B:
FIG. 5B is a diagram illustrating a qualitative comparison of reconstructed point clouds according to an embodiment.
Figure 5C:
FIG. 5C is a diagram illustrating a qualitative comparison of reconstructed point clouds according to an embodiment.
Figure 5D:
FIG. 5D is a diagram illustrating a qualitative comparison of reconstructed point clouds according to an embodiment.
Figure 5E:
FIG. 5E is a diagram illustrating a qualitative comparison of reconstructed point clouds according to an embodiment.

We propose a computationally fast sampling method for irregular points in 3D. Let $V=\{v_i=(x_i, y_i, z_i)\}, \forall i \in R^{N\times 3}$ represent the 3D coordinates of N points. We assume that the points are voxelized and represented as integer coordinates. We define a sampling pattern on a regular 3D grid for a particular sampling rate. Then, the defined sampling pattern is overlapped onto the irregular 3D points of the point cloud to generate the sampling set. For a sampling rate of 0.5, we sample every second point in the x, y and z directions. Similarly, for a sampling rate of 0.33 and 0.25, we sample every third and fourth point respectively in the x, y and z directions. The sampling patterns for 0.5, 0.33 and 0.25 sampling rates are shown in FIGS. 2a, 2b and 2c, respectively.

FIG. 2: Sampling pattern for different sampling rates on a 3D grid. Red points represents the sampling set. The attributes of blue points should be interpolated using the attributes of red point at the decoder end.

To mathematically formulate the sampling rule, let us define a function fk(vi) such that,

[Formula 1]

$$f_k(v_i) = \begin{cases} 1, & \text{if } x_i + y_i + z_i = 0 \pmod{k} \\ 0, & \text{otherwise.} \end{cases} \quad (1)$$

The function fk (vi) maps every point in V to {0, 1} i.e., fk: V→{0, 1}. Therefore, the sampling set can be defined as,

[Formula 2]

$$S=\{i:f_k(v_i)=1\}, \quad (2)$$

and the sampling rate for fk (•) is 1/k. The proposed sampling method has a low overhead on G-PCC encoders since it can be implemented with O(N) operations.

2.4. Proposed Interpolation

After the sampled points of chroma signal are encoded, we use interpolation to reconstruct chroma signal at the decoder end. Note that the full resolution geometry has to be encoded, since it is needed to represent the full resolution luma information. In our comparisons we assume that the point cloud geometry is available at both the encoder and decoder side and focus only on the cost of encoding attributes. We use graph based filters with K-nearest neighbor (K-NN) graph construction for interpolation.

Let $\hat{U}^s=\{u_i, \forall i \in S\}$ be the low resolution, reconstructed chroma signal and $U_{s^c}=\{u \text{ to } j, \forall j \in S^c\}$ be the chroma values to be interpolated. The interpolated value at node $j \in S^c$ is,

[Formula 3]

$$\hat{u}_j = \frac{1}{d_j} \sum_{i \in N(j)} w_{ij} \hat{u}_i; \quad (3)$$

where the sum is over K-nearest neighbors of node j and $d_i = \Sigma_j w_{ij}$ is the degree of node j. We use a Gaussian weighting function for K-NN graph construction,

[Formula 4]

$$w_{ij} = e^{-\frac{\|v_i - v_j\|_2^2}{2\sigma^2}}, \quad (4)$$

where $\sigma=(\Sigma i, j \|v_i-v_j\|^2_2)/N$, $j=S^c$, $i \in N(j)$ and $N(j) \subset S$, vi, vj are the 3D coordinates of points i and j respectively. As the distance between the points in S and Sc change for different sampling rates, we choose mean distance between the points in these two sets for the parameter σ. The proposed interpolation method can be implemented by a sparse matrix-vector product.

[Formula 5]

$$\begin{pmatrix} \hat{u}_1 \\ \hat{u}_2 \\ \vdots \\ u|\hat{S}^c| \end{pmatrix} = \begin{pmatrix} w_{11} & \cdots & w_{1|S|} \\ w_{21} & \cdots & w_{2|S|} \\ \vdots & \cdots & \vdots \\ w_{1|S^c||1} & \cdots & w_{|S^c||S|} \end{pmatrix} \begin{pmatrix} \hat{u}_1 \\ \hat{u}_2 \\ \vdots \\ u|\hat{S}^c| \end{pmatrix} \quad (5)$$

The chroma signal of the full resolution point cloud can be obtained by combining the interpolated and decoded chroma signal,

[Formula 6]

$$\hat{U} = \{\hat{u}_i \cup \tilde{u}_j, \forall i \in S \text{ and } j \in S^c\}. \quad (6)$$

The proposed interpolation method can be implemented with O(KN log(N)) operations for graph construction and O(KN) operations for matrix-vector multiplication.

3. Experiments

In this section, we present an end-to-end evaluation of the effectiveness of chroma subsampling on attribute compression for two G-PCC encoders-RAHT and RAGFT. We evaluate the proposed method on the "8iVFBv2" point cloud dataset. The dataset consists of four sequences: longdress, redandblack, soldier and loot. We compare the performance of the proposed method against RAHT and RAGFT without chroma subsampling. We use the Bjontegaard metric to compare the rate-distortion curves of attribute coding with and without chroma subsampling. We report results of chroma subsampling at a sampling rate of 50%. Even though the preliminary results for 25% and 33% sampling rates are promising, due to lack of space we are not including them, as they also require a more thorough evaluation of perceptual quality of the reconstructed point cloud, which is left for future work.

In all the experiments, we perform uniform quantization and entropy code the coefficients using the adaptive run-length Golomb-Rice algorithm (RLGR). For the RAGFT encoder, the block size of 16 was used in all the experiments. We use K=10 for K-NN interpolation. The distortion PSNR for the attributes is calculated in both the RGB and the YUV space. In the RGB space, we use pixel-wise PSNR which is given by,

[Formula 7]

$$PSNR_{rgb} = -10 \log_{10}(MSE_{rgb}) \quad (7)$$

where, $MSE_{rgb} = (\|R-\hat{R}\|^2_2 + \|G-\hat{G}\|^2_2 + \|B-\hat{B}\|^2_2)/(3N255^2)$ and N is the total number of points in the full resolution point cloud.

Along with the pixel-wise PSNR value in RGB space, we use color-sensitive-based combined PSNR (CS-PSNR), a video quality assessment metric which takes into account the sensitivity of the human visual system to different color components,

[Formula 8]

$$CS\text{-}PSNR = -10 \log_{10}(P_Y MSE_Y + P_U MSE_U + P_V MSE_V), \quad (8)$$

where PY=0.695, PU=0.130, PV=0.175 are the weighting coefficients. The total rate is reported in bits per point [bpp] B=(BY+BU+BV)/N where, BY, BU and BV represent the bits required to encode Y, U and V components respectively.

3.1. Results of Attribute Compression

The rate-distortion curves for four point cloud sequences in the RGB space and the YUV space are shown in FIG. 3 and FIG. 4 respectively.

FIG. 3: Distortion rate curves for color attribute compression in RGB space

FIG. 4: Distortion rate curves for color attribute compression in YUV space using CS-PSNR There is a considerable gain in attribute coding using chroma subsampling for both RAHT and RAGFT encoders. Tables 2 and 3 show average PSNR gain and percentage bitrate saving for RAHT and RAGFT respectively at a sampling rate of 50%.

Table 2: Average PSNR gain and percentage bitrate savings in RGB and YUV space using the RAHT encoder at a sampling rate of 50%

Table 3: Average PSNR gain and percentage bitrate savings in RGB and YUV space using the RAGFT encoder at a sampling rate of 50%

TABLE 2

| | RGB space | | YUV space | |
|---|---|---|---|---|
| sequence | avg. psnr gain (dB) | bitrate saving (bpp) | avg. psnr gain (dB) | bitrate saving (bpp) |
| longdress | 0.59 | 9.61% | 0.85 | 14.24% |
| redblack | 0.56 | 11.09% | 0.81 | 17.12% |
| soldier | 0.09 | 1.9% | 0.15 | 3.0% |
| loot | 0.1 | 3.13% | 0.18 | 5.63% |

TABLE 3

| | RGB space | | YUV space | |
|---|---|---|---|---|
| sequence | avg. psnr gain (dB) | bitrate saving (bpp) | avg. psnr gain (dB) | bitrate saving (bpp) |
| longdress | 0.23 | 4.23% | 0.63 | 10.39% |
| redblack | 0.13 | 2.64% | 0.53 | 10.70% |
| soldier | 0.12 | 1.03% | 0.26 | 3.25% |
| loot | 0.05 | 1.45% | 0.21 | 2.74% |

The bitrate savings for longdress and redandblack sequences is around 10-12%, and for soldier and loot sequences it is around 2-3%. From our own qualitative comparison of reconstructed point clouds with and without chroma subsampling in FIG. 5, we have observed that these significant reductions in bitrate for attribute coding are achieved with little or no impact on perceived quality of the reconstructed point cloud.

FIG. 5: Qualitative comparison of reconstructed point clouds. FIGS. 5b and 5c shows the reconstructed point clouds from RAHT and RAGFT without chroma subsampling. FIGS. 5d and 5e shows the reconstructed point cloud from RAHT and RAGFT respectively with chroma subsampling at a sampling rate of 50%.

3.2 Complexity Analysis

We compare the run-time of both RAHT and RAGFT, with and without chroma subsampling. We performed experiments on the first 20 point cloud frames of longdress sequence and compute encoder and decoder run-times.

Table 4: Comparison of encoding and decoding time (per frame) for RAHT and RAGFT encoders on 20 longdress point cloud frames.

TABLE 4

| time/frame (in seconds) | RAHT | RAHT+ sampling | RAGFT | RAGFT+ sampling |
|---|---|---|---|---|
| encoding time | 0.47 | 0.72 | 27.99 | 34.26 |
| decoding time | 0.42 | 2.53 | 26.75 | 35.61 |

From the results in Table 4 we observe a very small overhead at the encoder but considerable overhead at the decoder. This can be attributed to the interpolation process, which involves graph construction and filtering, whereas the sampling algorithm is implemented in O(N) complexity. However, we expect that the complexity can be reduced by constructing sparser graphs by limiting the number of nearest neighbors. We will address the issue of interpolation complexity in our future work.

Embodiment

Hereinafter, specific examples of an embodiment of the present invention will be described with reference to the accompanying drawings. Meanwhile, components in the following embodiment can be appropriately replaced with existing components and the like, and various variations including combinations with other existing components are possible. Therefore, the following description of the embodiment is not intended to limit the content of the invention described in the claims.

Hereinafter, a point cloud processing system 10 according to an embodiment of the present invention will be described with reference to FIGS. 6 to 8.

Figure 6:
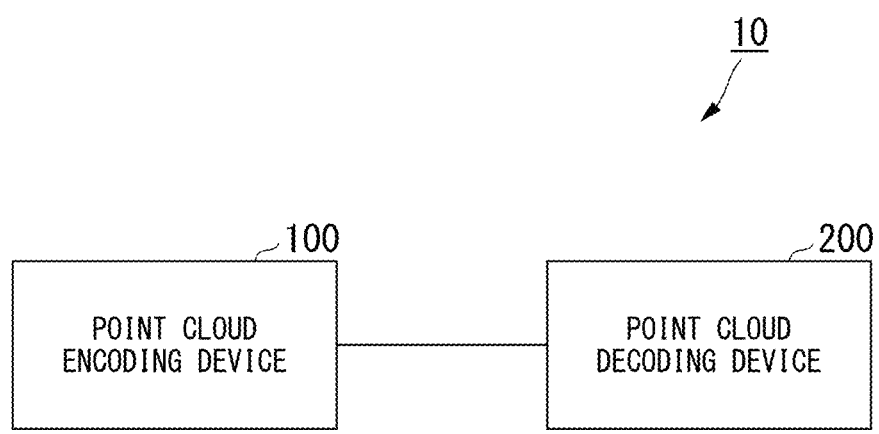
FIG. 6 is a diagram illustrating a point cloud processing system according to an embodiment.

FIG. 6 is a diagram illustrating the point cloud processing system 10 according to the present embodiment. As shown in FIG. 6, the point cloud processing system 10 includes a point cloud encoding device 100 and a point cloud decoding device 200.

The point cloud encoding device 100 is configured to generate encoded data (bitstream) by encoding an input point cloud signal. The point cloud decoding device 200 is configured to generate an output point cloud signal by decoding the bitstream.

Meanwhile, the input point cloud signal and the output point cloud signal are constituted by position information and attribute information of each point in a point cloud. The attribute information is, for example, color information (for example, RGB signals) and reflectance of each point.

Here, such a bitstream may be transmitted from the point cloud encoding device 100 to the point cloud decoding device 200 through a transmission channel. In addition, the bitstream may be stored in a storage medium and then provided from the point cloud encoding device 100 to the point cloud decoding device 200.

(Point Cloud Encoding Device 100)

Hereinafter, the point cloud encoding device 100 according to the present embodiment will be described with reference to FIG. 7.

Figure 7:
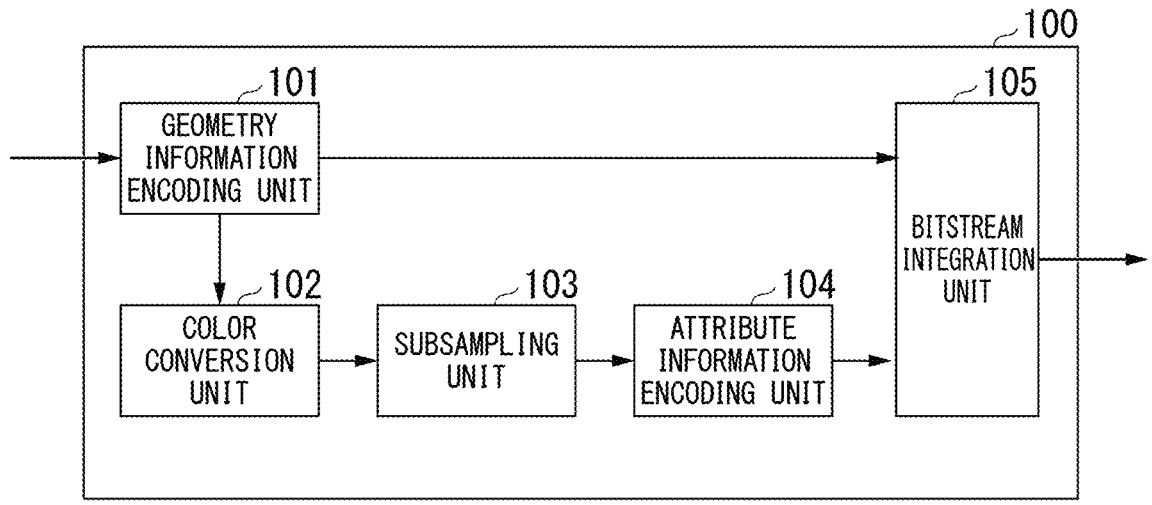
FIG. 7 is a diagram illustrating an example of a functional block of a point cloud encoding device according to an embodiment.

FIG. 7 is a diagram illustrating an example of a functional block of the point cloud encoding device 100 according to the present embodiment. As shown in FIG. 7, the point cloud encoding device 100 includes a geometry information encoding unit 101, a color conversion unit 102, a subsampling unit 103, an attribute information encoding unit 104, and a bitstream integration unit 105.

The geometry information encoding unit 101 uses an input point cloud signal (point cloud to be encoded) as an input to perform a process of encoding geometry information, and outputs a bitstream of geometry information (encoded data of geometry information) to the bitstream integration unit 105. Here, a method of encoding geometry information can be realized by a known method such as, for example, G-PCC, and thus the details thereof will be omitted here.

In addition, the geometry information encoding unit 101 executes a process of locally decoding geometry information and generates a reconstructed point cloud based on the geometry information obtained on the decoding side. At this time, in a case where the geometry information does not completely match between the point cloud to be encoded and the reconstructed point cloud, attribute information of each point in the reconstructed point cloud (color information in an RGB format will be described below as an example) is generated on the basis of the color information of the point cloud to be encoded. That is, the attribute information is information indicating the attribute (for example, color) of each point in a point cloud.

For example, the geometry information encoding unit 101 may specify a point with the smallest L2 distance among the points in the point cloud to be encoded for each point in the reconstructed point cloud, and use the color information of the specified point as it is or estimate it from the color information of the specified point. Alternatively, the geometry information encoding unit 101 may specify K neighboring points in the point cloud to be encoded for each point in the reconstructed point cloud, and calculate the color information from the specified K neighboring points in the interpolation process. The reconstructed point cloud generated in this way is output to the color conversion unit 102.

Meanwhile, the geometry information encoding unit 101 may output the input point cloud to be encoded as it is to the color conversion unit 102 without generating the above described reconstructed point cloud.

The color conversion unit 102 uses the reconstructed point cloud output from the geometry information encoding unit as an input to perform color conversion on the color information of each point in the reconstructed point cloud. Here, as an example of color conversion, in a case where the color information of the reconstructed point cloud is in an RGB format, the color conversion unit 102 converts it into a YCbCr format (a luma signal (Y) and chroma signals (Cb, Cr)).

The color conversion unit 102 outputs the reconstructed point cloud after color conversion to the subsampling unit 103.

The subsampling unit 103 uses the reconstructed point cloud after color conversion output from the color conversion unit 102 as an input to perform subsampling on chroma signals in the color information (a luma signal (Y) and chroma signals (Cb, Cr)) of each point in the reconstructed point cloud.

Specifically, the coordinates of an i-th point (i=0, 1, 2, . . . , N−1) in the three-dimensional coordinate system in the reconstructed point cloud constituted by N points are defined as $(x_i, y_i, z_i)$. In this case, the subsampling unit 103 holds the chroma signals only for points where the following Equation (9) is established, and discards the chroma signals of other points. This makes it possible to realize subsampling.

$$x_i + y_i + z_i = 0 \pmod{k} \tag{9}$$

Here, "mod k" is the remainder of division by k. Therefore, the subsampling unit 103 holds the chroma signal of a point $(x_i, y_i, z_i)$ in a case where the remainder of a result of dividing the value of "$x_i+y_i+z_i$" by k is 0, and discards the chroma signal of the point $(x_i, y_i, z_i)$ in a case where the remainder is not 0. Examples of sampling points (examples of sampling patterns) are shown in FIGS. 2A, 2B, and 2C described above. As shown in FIGS. 2A, 2B, and 2C, when k=2, the chroma signals are held at only about 50% of the total points (see FIG. 2A), when k=3, the chroma signals are held at only about 33% of the total points (see FIG. 2B), when k=4, the chroma signals are held at only about 25% of the total points (see FIG. 2C), and the chroma signals are discarded at the other points.

The subsampling unit 103 does not perform subsampling on the luma signal (Y). Therefore, the subsampling unit 103 holds the luma signals of all points in the reconstructed point cloud.

Meanwhile, the value of chroma signals at a point where chroma signals are determined to be discarded need only be set to a value that can be identified as having been discarded such as, for example, being set to "−1." Alternatively, a flag indicating whether the chroma signals are held may be assigned to each point, and whether the chroma signals are held or discarded may be identified by the flag.

The subsampling unit 103 outputs the reconstructed point cloud after subsampling of the chroma signals to the attribute information encoding unit 104.

The attribute information encoding unit 104 uses the reconstructed point cloud after subsampling of the chroma signals output from the subsampling unit 103 as an input to perform a process of encoding attribute information, and outputs the bitstream of the attribute information (encoded data of the attribute information) to the bitstream integration unit 105. Here, a method of encoding attribute information can be realized using a known method such as, for example, G-PCC, and thus the details thereof will be omitted here. The attribute information encoding unit 104 does not encode the chroma signals for the points where the chroma signals are discarded by the subsampling unit 103 in the process of encoding attribute information.

It is widely known that human visual Characteristics are sensitive to changes in luma signals but insensitive to changes in chroma signals. Thus, by holding the luma signals all points and subsampling the chroma signals as described above, it is possible to reduce the code amount of attribute information while preventing the subjective quality of the reconstructed point cloud from deteriorating.

The bitstream integration unit 105 integrates the bitstream of geometry information output from the geometry information encoding unit 101 and the bitstream of attribute information output from the attribute information encoding unit 104 to generate and output a bitstream.

(Point Cloud Decoding Device 200)

Hereinafter, the point cloud decoding device 200 according to the present embodiment will be described with reference to FIG. 8.

Figure 8:
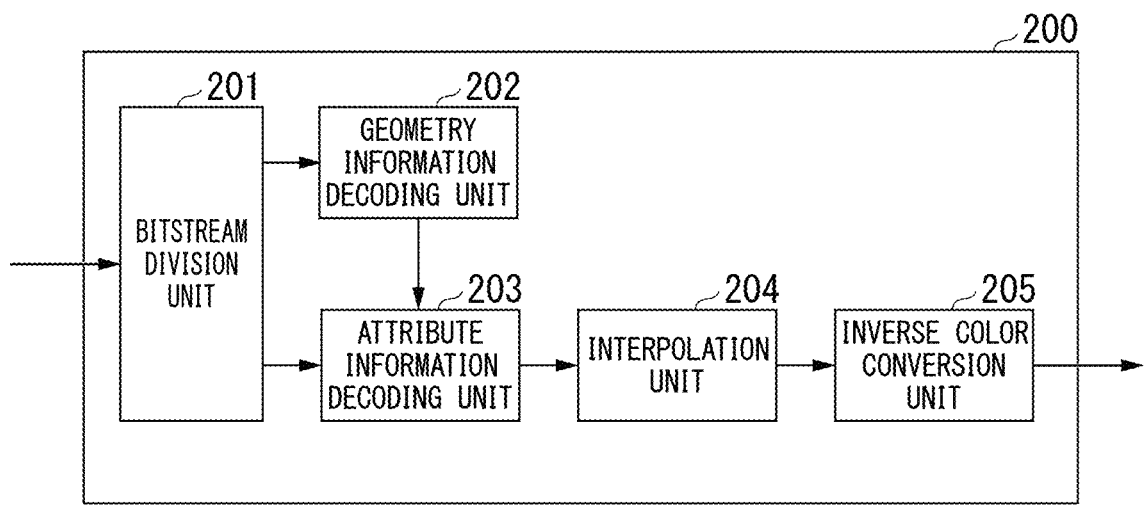
FIG. 8 is a diagram illustrating an example of a functional block of a point cloud decoding device according to an embodiment.

FIG. 8 is a diagram illustrating an example of a functional block of the point cloud decoding device 200 according to the present embodiment. As shown in FIG. 8, the point cloud decoding device 200 includes a bitstream division unit 201, a geometry information decoding unit 202, an attribute information decoding unit 203, an interpolation unit 204, and an inverse color conversion unit 205.

The bitstream division unit 201 uses the bitstream output from the point cloud encoding device 100 as a input to divide the bitstream into a bitstream of geometry information and a bitstream of attribute information. The bitstream division unit 201 outputs the bitstream of the geometry information to the geometry information decoding unit 202 and outputs the bitstream of the attribute information to the attribute information decoding unit 203.

The geometry information decoding unit 202 uses the bitstream of the geometry information output from the bitstream division unit 201 as an input to decode the geometry information and generate a reconstructed point cloud. At this point in time, each point in the reconstructed point cloud has only the geometry information. A specific method of decoding geometry information can be realized using a known method such as, for example, G-PCC similar to the geometry information encoding unit 101 described above, and thus the details thereof will be omitted here. The geometry information decoding unit 202 outputs the reconstructed point cloud of only the geometry information to the attribute information decoding unit 203.

The attribute information decoding unit 203 uses the bitstream of the attribute information output from the bitstream division unit 201 and the reconstructed point cloud of only the geometry information output from the geometry information decoding unit 202 as inputs to decode the attribute information (for example, color information) of each point in the reconstructed point cloud from the bitstream of the attribute information.

Here, the color information is constituted by a luma signal and chroma signals, and a process of decoding chroma signals may be omitted for points where the chroma signals are determined to be discarded in the subsampling unit 103. Regarding a specific position of a point where the chroma signals are discarded, for example, by using the same subsampling method between the point cloud encoding device 100 and the point cloud decoding device 200 in advance, the point cloud encoding device 100 and the point cloud decoding device 200 can obtain the same determination result of the point where the chroma signals are discarded using the subsampling method even without additional information or the like. Alternatively, only the value of k in Equation (9) described above may be determined by the point cloud encoding device 100, and the determined value of k may be stored as a part of control data in the bitstream and transmitted from the point cloud encoding device 100 to the point cloud decoding device 200.

A specific method of decoding attribute information can be realized using a known method such as, for example, G-PCC similar to the attribute information encoding unit 104 described above, and thus the details thereof will be omitted here. The attribute information decoding unit 203 outputs the reconstructed point cloud in which the chroma signals are decoded only for some points to the interpolation unit 204.

The interpolation unit 204 uses the reconstructed point cloud in which the chroma signals are decoded only for some points output from the attribute information decoding unit 203 as an input, and interpolates the chroma signals of points where the chroma signals have not been decoded on the basis of the chroma signals of the points where the chroma signals have been decoded, to thereby generate and output a reconstructed point cloud of luma signals and chroma signals of all points.

An example of the process of interpolating a chroma signal may be to calculate the value of the chroma signal for a point where the chroma signal has not been decoded by using predetermined K neighboring points (K neighboring points) where the chroma signal has been decoded for a point where the chroma signal has not been decoded to perform weighted average on the value of the decoded chroma signal for each of the K neighboring points. In addition, the interpolation process may be performed using graph filtering based on the K neighboring points. The weight of each neighboring point in constructing a K-neighboring graph may be determined on the basis of a Gaussian function using an L2 distance between a corresponding point (point to be interpolated) and its neighboring point. Specifically, Equation (3) ([Formula 3]) and Equation (4) ([Formula 4]) described above may be used.

The interpolation unit 204 performs the interpolation process on the chroma signals for all points where the chroma signals have not been decoded in the reconstructed point cloud, and outputs the reconstructed point cloud having the luma signals and the chroma signals of all points to the inverse color conversion unit 205.

The inverse color conversion unit 205 uses the reconstructed point cloud having the luma signals and the chroma signals of all points output from the interpolation unit 204 as inputs, and performs inverse color conversion on the luma signal and chroma signals of each point in the reconstructed point cloud. Here, an example of inverse color conversion is to perform conversion from a YCbCr format (luma signal (Y) and chroma signals (Cb, Cr)) to an RGB format which is the inverse conversion of the color conversion of the color conversion unit 102 described above (conversion from an RGB format to a YCbCr format (luma signal (Y) and chroma signals (Cb, Cr))). The inverse color conversion unit 205 generates and outputs a reconstructed point cloud (output point cloud signal) having color information in an RGB format obtained by inverse color conversion at all points.

The point cloud encoding device according to the present embodiment includes a subsampling unit configured to preserve chroma signals of some points in a point cloud to be encoded and discard chroma signals of remaining points other than those points, and an attribute information encoding unit configured to encode the chroma signals of those points in the point cloud to be encoded and luma signals of all points. This makes it possible to improve encoding efficiency for attribute information in point cloud information.

The subsampling unit may perform subsampling on chroma signals so that points where chroma signals are preserved are at a predetermined ratio.

The subsampling unit may preserve chroma signals only for points where the remainder of a result of dividing a sum of coordinate values in a three-dimensional coordinate system by a predetermined integer value is 0 in the point cloud to be encoded.

The point cloud encoding device may further include a color conversion unit configured to convert color information of each point in the point cloud to be encoded into a luma signal and chroma signals.

The point cloud decoding device according to the present embodiment includes an attribute information decoding unit configured to decode chroma signals of some points and luma signals of all points in a reconstructed point cloud reconstructed from a bitstream, and an interpolation unit configured to interpolate chroma signals of a non-decoding target point which is a point where chroma signals are not decoded in the reconstructed point cloud on the basis of decoded chroma signals of a decoding target point which is a target point for decoding chroma signals. This makes it possible to obtain a reconstructed point cloud having chroma signals and luma signals of all points from the bitstream output from the point cloud encoding device according to the present embodiment.

The interpolation unit may interpolate the chroma signals of the non-decoding target point using the decoded chroma signals of each of a predetermined number of the decoding target points present in the vicinity of the non-decoding target point.

The point cloud decoding device may further include an inverse color conversion unit configured to convert a luma signal and chroma signals of each point in the reconstructed point cloud into color information.

The point cloud encoding device 100 and the point cloud decoding device 200 described above may be realized by a program causing a computer to execute each function (each step).

Meanwhile, although the present invention has been described with an example of application to the point cloud encoding device 100 and the point cloud decoding device 200 in the above embodiment, the present invention is not limited only to such an example, and can be similarly applied to a point cloud encoding/decoding system having the functions of the point cloud encoding device 100 and the point cloud decoding device 200.

As described above, according to the present embodiment, by reducing the number of points where the chroma signals are encoded by subsampling, it is possible to improve encoding efficiency while suppressing the influence of deterioration on the subjective image quality.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

In addition, a computer program for realizing the function of each device described above may be recorded in a computer readable recording medium, and the program recorded in this recording medium may be read and executed by a computer system. Meanwhile, the term "computer system" referred to here may include an OS and hardware such as peripheral devices.

In addition, the term "computer readable recording medium" refers to a writable non-volatile memory such as a flexible disk, a magnetooptic disc, a ROM, or a flash memory, a portable medium such as a digital versatile disc (DVD), or a storage device such as a hard disk built into the computer system.

Further, the "computer readable recording medium" is assumed to include recording mediums that hold a program for a certain period of time like a volatile memory (for example, a dynamic random access memory (DRAM)) inside a computer system serving as a server or a client in a case where a program is transmitted through networks such as the Internet or communication lines such as a telephone line.

In addition, the above-mentioned program may be transmitted from a computer system having this program stored in a storage device or the like through a transmission medium or through transmitted waves in the transmission medium to other computer systems. Here, the "transmission medium" that transmits a program refers to a medium having a function of transmitting information like networks (communication networks) such as the Internet or communication channels (communication lines) such as a telephone line.

In addition, the above-mentioned program may realize a portion of the above-mentioned functions. Further, the program may be a so-called difference file (difference program) capable of realizing the above-mentioned functions by a combination with a program which is already recorded in a computer system.

8i Corporation owns the copyright to the data sets in FIGS. 5A-5E.

This invention was made with government support under CNS-1956190 a warded by National Science Foundation (NSF).

The government has certain rights in the invention.

EXPLANATION OF REFERENCES

10 Point cloud processing system
100 Point cloud encoding device
101 Geometry information encoding unit
102 Color conversion unit
103 Subsampling unit
104 Attribute information encoding unit
105 Bitstream integration unit
200 Point cloud decoding device
201 Bitstream division unit
202 Geometry information decoding unit
203 Attribute information decoding unit
204 Interpolation unit
205 Inverse color conversion unit

What is claimed is:

1. A point cloud decoding device, comprising:
a computer system; and
a memory including a computer program that, when executed by the computer system, causes the computer system to perform functions, the functions including:
three-dimensionally decoding chroma signals of some points and luma signals of all points in a reconstructed three-dimensional point cloud in a three-dimensional coordinate system reconstructed from a bitstream; and
three-dimensionally interpolating chroma signals of a non-decoding target point, which is a point where chroma signals are not decoded in the three-dimensional reconstructed point cloud, based on the decoded chroma signals of K predetermined neighboring points of a decoding target point, which is a target point for decoding chroma signals.

2. The point cloud decoding device according to claim 1, wherein the computer system interpolates the chroma signals of the non-decoding target point using the decoded chroma signals of each of a predetermined number of the decoding target points present in a vicinity of the non-decoding target point,
the computer system calculates a value of the chroma signal for the point where the chroma signal has not been decoded by using predetermined K neighboring points where a chroma signal has been decoded for the point where the chroma signal has not been decoded to perform a weighted average on values of decoded chroma signals for the predetermined K neighboring points, and
a weight of each of the predetermined K neighboring points in constructing a K-neighboring graph is determined based on a Gaussian function using an L2 distance between a corresponding point and a neighboring point of the corresponding point.

3. The point cloud decoding device according to claim 1, wherein the functions further include converting a luma signal and chroma signals of each point in the reconstructed three-dimensional point cloud into color information.

4. A point cloud decoding method, comprising:
three-dimensionally decoding chroma signals of some points and luma signals of all points in a reconstructed three-dimensional point cloud in a three-dimensional coordinate system reconstructed from a bitstream; and
three-dimensionally interpolating chroma signals of a non-decoding target point, which is a point where chroma signals are not decoded in the reconstructed three-dimensional point cloud, based on the decoded chroma signals of K predetermined neighboring points of a decoding target point, which is a target point for decoding chroma signals.

5. A non-transitory computer-readable medium including a program for causing a computer, included in a point cloud decoding device, to execute:
three-dimensionally decoding chroma signals of some points and luma signals of all points in a reconstructed three-dimensional point cloud in a three-dimensional coordinate system reconstructed from a bitstream; and
three-dimensionally interpolating chroma signals of a non-decoding target point, which is a point where chroma signals are not decoded in the reconstructed three-dimensional point cloud, based on the decoded chroma signals of K predetermined neighboring points of a decoding target point, which is a target point for decoding chroma signals.

* * * * *